US012523062B2

(12) United States Patent
Bai

(10) Patent No.: US 12,523,062 B2
(45) Date of Patent: Jan. 13, 2026

(54) AUTOMATIC LOCKING DEVICE AND WINDOW

(71) Applicant: GUANGDONG KIN LONG HARDWARE PRODUCTS CO., LTD, Guangdong (CN)

(72) Inventor: Baokun Bai, Dongguan (CN)

(73) Assignee: GUANGDONG KIN LONG HARDWARE PRODUCTS CO., LTD, Guangdong (CN)

( * ) Notice: Subject to any disclaimer, the term of this patent is extended or adjusted under 35 U.S.C. 154(b) by 0 days.

(21) Appl. No.: 18/609,866

(22) Filed: Mar. 19, 2024

(65) Prior Publication Data

US 2024/0360694 A1 Oct. 31, 2024

(30) Foreign Application Priority Data

Apr. 27, 2023 (CN) ........................ 202310476668.2

(51) Int. Cl.
*E05B 15/04* (2006.01)
*E05B 9/02* (2006.01)

(52) U.S. Cl.
CPC ................ *E05B 15/04* (2013.01); *E05B 9/02* (2013.01); *E05B 2015/0413* (2013.01); *E05B 2015/0448* (2013.01)

(58) Field of Classification Search
CPC .......... E05C 19/02; E05C 19/06; E05C 19/08; Y10T 292/696; E05B 15/02; E05B 15/022; E05B 15/04; E05B 63/24; Y10S 292/20; Y10S 292/47
See application file for complete search history.

(56) References Cited

U.S. PATENT DOCUMENTS 959,241 A * 5/1910 Mallory .................. E05C 19/02 292/71
1,158,533 A * 11/1915 Moore ................ E05B 47/0002 292/71
1,475,725 A * 11/1923 Steinmark ............. E05B 63/128 292/341.15

(Continued)

FOREIGN PATENT DOCUMENTS

CN 205531704 U 8/2016
CN 107587795 A 1/2018

(Continued)

OTHER PUBLICATIONS

Search Report issued for GB Patent Application No. 2402876.3, dated Feb. 13, 2025, 5 pages.

(Continued)

*Primary Examiner* — Carlos Lugo
(74) *Attorney, Agent, or Firm* — HSML P.C.

(57) ABSTRACT

An automatic locking device is provided. The automatic locking device includes a locking base and a locking tongue. The locking tongue is slidably mounted on the locking base in an elastically resettable manner. The automatic locking device further includes a force assisting lever. The force assisting lever is rotatably mounted to the locking tongue. The force assisting lever is provided with a first force assisting surface and a second force assisting surface. The automatic locking device is configured to lock the locking point normally and automatically when the locking point moves down.

8 Claims, 8 Drawing Sheets

(56) References Cited

U.S. PATENT DOCUMENTS

| | | | | | |
|---|---|---|---|---|---|
| 1,479,744 | A * | 1/1924 | Salata | E05B 63/248 | 292/341.15 |
| 1,574,023 | A * | 2/1926 | Crompton | E05C 3/34 | 292/DIG. 40 |
| 2,048,334 | A * | 7/1936 | Gredell | E05B 65/0858 | 296/57.1 |
| 2,310,550 | A * | 2/1943 | Roethel | E05B 85/22 | 292/341.15 |
| 4,351,288 | A * | 9/1982 | Gasloli | F24C 15/022 | 126/192 |
| 4,655,489 | A * | 4/1987 | Bisbing | E05C 19/022 | 292/110 |
| 6,659,514 | B2 * | 12/2003 | Bass | E05B 47/0002 | 292/201 |
| 7,032,939 | B2 * | 4/2006 | Magnusson | E05B 63/122 | 292/121 |
| 7,278,664 | B2 * | 10/2007 | Su | E05C 19/022 | 292/341.15 |
| 7,775,565 | B2 * | 8/2010 | Hartmann | A47L 15/4259 | 292/216 |
| 8,276,951 | B2 * | 10/2012 | Dirnberger | A47L 15/4259 | 292/216 |
| 8,376,418 | B2 * | 2/2013 | Osvatic | E05C 3/24 | 292/201 |
| 8,376,423 | B2 * | 2/2013 | Lesjak | E05C 19/022 | 292/341.15 |
| 9,151,095 | B2 * | 10/2015 | Syring | E05B 17/0025 | |
| 10,806,322 | B2 * | 10/2020 | Dirnberger | E05B 47/0603 | |
| 11,272,826 | B2 * | 3/2022 | Krieger | E05C 19/02 | |

FOREIGN PATENT DOCUMENTS

| | | | | |
|---|---|---|---|---|
| CN | 212428369 | U | 1/2021 | |
| CN | 113389440 | A | 9/2021 | |
| DE | 19506430 | C2 * | 4/1997 | E05D 15/52 |
| DE | 102004011880 | A1 * | 9/2005 | E05C 9/1808 |
| DE | 102004049068 | A1 | 4/2006 | |
| DE | 102018009217 | A1 | 5/2020 | |
| DE | 102014221292 | B4 | 10/2020 | |
| EP | 0455935 | A1 * | 11/1991 | E05B 15/04 |
| EP | 0728888 | A1 | 8/1996 | |
| EP | 1582673 | A2 | 10/2005 | |
| EP | 2479363 | A2 * | 7/2012 | E05B 17/0025 |
| KR | 200386711 | Y1 | 6/2005 | |

OTHER PUBLICATIONS

First Office Action issued for Chinese Patent Application No. 202310476668.2, dated Aug. 6, 2025, 13 pages including machine translation.

* cited by examiner

AUTOMATIC LOCKING DEVICE AND WINDOW

CROSS-REFERENCE TO RELATED APPLICATIONS

The present disclosure claims priority to Chinese patent application No. 2023104766682, filed on Apr. 27, 2023, the entire content of which is incorporated herein by reference.

TECHNICAL FIELD

The application relates to a window locking structure, and more particularly, relates to an automatic locking device and a window mounted with the automatic locking device.

BACKGROUND

A window consists of a window frame and a window sash. Generally, the window sash is driven manually by a handle to enable a locking point of window sash to be locked into a locking mechanism provided on the window frame to lock the window sash. In order to cope with the dangerous situations such as a strong wind or a fire, an automatic locking mechanism is designed, and the window sash can be automatically locked in an unmanned state. A conventional automatic locking mechanism of a window generally adopts a locking principle that a locking point pushes against a guiding surface of a locking tongue, thereby enabling the locking tongue to avoid the locking point, then elastically resets to lock the locking point. Nevertheless, due to processing errors, a window sash deformation, mounting errors and other influencing factors, the window sash may tilt or drop. A locking point on a window sash transmission rod will also move down with a tilting or dropping of the window sash. As the locking point position moves down, the locking point are staggered with the guiding surface cooperating normally with the locking tongue, and the locking cannot be realized automatically.

SUMMARY

The technical problem to be addressed by the present disclosure is to provide an automatic locking device and a window mounted with the automatic locking devices, which can prevent the failure of a locking point from moving downward in view of the above-mentioned defect of the prior art that a position of the locking point position moves downward due to a dropping of the window sash.

In a first aspect of the present disclosure, an automatic locking device configured to lock an external locking point is provided. The automatic locking device includes a locking base and a locking tongue slidably mounted on the locking base in an elastically resettable manner. The locking tongue is provided with an inclined guiding surface and an engaging surface away from the guiding surface. The locking point pushes against the guiding surface to enable the locking tongue to slide relative to the locking base while moving along a locking path. The locking tongue is elastically reset when the locking point crosses the guiding surface and locking the locking point through the engaging surface. The automatic locking device further includes a force assisting lever rotatably mounted to the locking tongue. The force assisting lever is provided with a first force assisting surface and a second force assisting surface. The first force assisting surface is located outside and below of the guiding surface to abut against the locking point in a locking process of a downward movement of locking point, when the locking point pushes against the first force assisting surface to enable the force assisting lever to rotate, the second force assisting surface abuts against a fulcrum fixed on the locking base and enable the locking tongue to slide downward until the locking point is in contact with the guiding surface, when the locking point crosses the guiding surface and the locking tongue is elastically reset, the second force assisting surface abuts against again the fulcrum and enable the force assisting lever to rotate reversely and reset.

In an embodiment of the automatic locking device according to the first aspect of the application, the locking tongue is provided with a first mounting cylinder, the force assisting lever is provided with a first mounting hole, and the force assisting lever is sleeved on the first mounting cylinder through the first mounting hole.

In an embodiment of the automatic locking device according to the first aspect of the application, the locking base is provided with at least a sliding groove extending in an up-down direction, at least one sliding block cooperating with the at least one sliding groove is protruded from a surface of the locking tongue opposite to the locking base, the at least one sliding block is slidably inserted into at least one sliding groove, and a locking cover is fixed to the locking base and configured to cover the locking tongue to restrict the sliding block of the locking tongue from disengaging from the sliding groove.

In an embodiment of the automatic locking device according to the first aspect of the application, at least one spring is abutted between a lower end of the locking tongue in a sliding direction of the locking tongue and a lower end of the locking cover, and the locking tongue is capable of being pushed by the locking point to slide downward to deform the spring.

In an embodiment of the automatic locking device according to the first aspect of the application, the locking cover is fixedly connected to the locking base by a first rivet and a second rivet provided at upper and lower ends respectively in the sliding direction of the locking tongue, when the locking tongue is pushed by the locking point to slide downward to an end of a sliding stroke, the lower end of the locking tongue abuts against the second rivet, and when the locking tongue is elastically reset upward to the end of the sliding stroke, the upper end of the locking tongue abuts against the first rivet.

In an embodiment of the automatic locking device according to the first aspect of the application, the second force assisting surface of the force assisting lever abuts with a periphery of the first rivet in a process that the locking point pushes against the first force assisting surface to enable the force assisting lever to rotate, so that the second force assisting surface takes the first rivet as the fulcrum to enable the locking tongue to slide downward.

In an embodiment of the automatic locking device according to the first aspect of the application, the locking base is also provided with a blocking wall aligned with the engaging surface of the locking tongue, and the locking point is driven to move up along the engaging surface of the locking tongue and is locked by the blocking wall after the locking point is disengaged from the engaging surface.

In an embodiment of the automatic locking device according to the first aspect of the application, the automatic locking device further includes an unlocking lever rotatably mounted on the locking tongue in an elastically resettable manner, wherein the unlocking lever comprises a first acting surface and a second acting surface, the first acting surface abuts with the locking point when the locking point pushes against the guiding surface to be locked between the engaging surface and the unlocking lever, so that the unlocking lever is pushed by the locking point to rotate to avoid the locking tongue, the second acting surface is located below the locking point when the unlocking lever rotates reversely and resets after the locking point is driven to move up and disengaged from the engaging surface, in a process that the locking point is driven to move down, the second acting surface abuts with the locking point, so as to enable the unlocking lever to drive the locking tongue to slide down until the locking point is disengaged from a blocking of the blocking wall.

In an embodiment of the automatic locking device according to the first aspect of the application, the locking tongue is provided with a second mounting cylinder, the unlocking lever is provided with a second mounting hole and is sleeved on the second mounting cylinder through the second mounting hole, a V-shaped elastic member is abutted between another side of the unlocking lever opposite to the first acting surface and a limiting wall protruding from the locking tongue, the unlocking lever is pushed against by the locking point and rotates to avoid the locking tongue to deform the V-shaped elastic member.

In a second aspect, the present disclosure provides a window to address the technical problem, including a window frame and a window sash. One of the window frame and the window sash includes a locking point, and another one of the window frame and the window sash includes an automatic locking device as described above.

The automatic locking device and window of the present disclosure has the following beneficial effects. According to the automatic locking device, the locking tongue is rotatably mounted to the force assisting lever. A first force assisting surface of the force assisting lever, which is positioned below and outside of the guiding surface of the locking tongue, abuts against the locking point which moves down and displaces, so that the force assisting lever rotates, and then the second force assisting surface of the force assisting lever abuts against the fulcrum fixed on the locking base to enable the locking tongue to slide downward. The locking point is guided to be in contact with the guiding surface in a normal cooperation to realize automatic locking. In this way, according to the automatic locking device of the embodiments of the present disclosure, the locking point also can be locked automatically and normally even if the locking point is away from the automatic locking device due to a tilting or dropping of the window sash, improving safety performance of a window and user experience. Moreover, a structure of the automatic locking device for preventing failure due to downward movement of the locking point and an unlocking structure are simple and practical, and convenient to be mounted.

BRIEF DESCRIPTION OF THE DRAWINGS

The present disclosure will be described hereinafter in combination with the accompanying drawings and embodiments.

DETAILED DESCRIPTION OF THE EMBODIMENTS

In order to make the purpose, technical solutions and advantages of the present disclosure clearer, the present disclosure will be further described in detail below with reference to the accompanying drawings and embodiments. It is understood that the specific embodiments described herein are merely illustrative of the present disclosure and are not intended to limit the present disclosure. And embodiments in the present disclosure and features in the embodiments can be combined with each other under the premise of no conflict.

Figure 1:
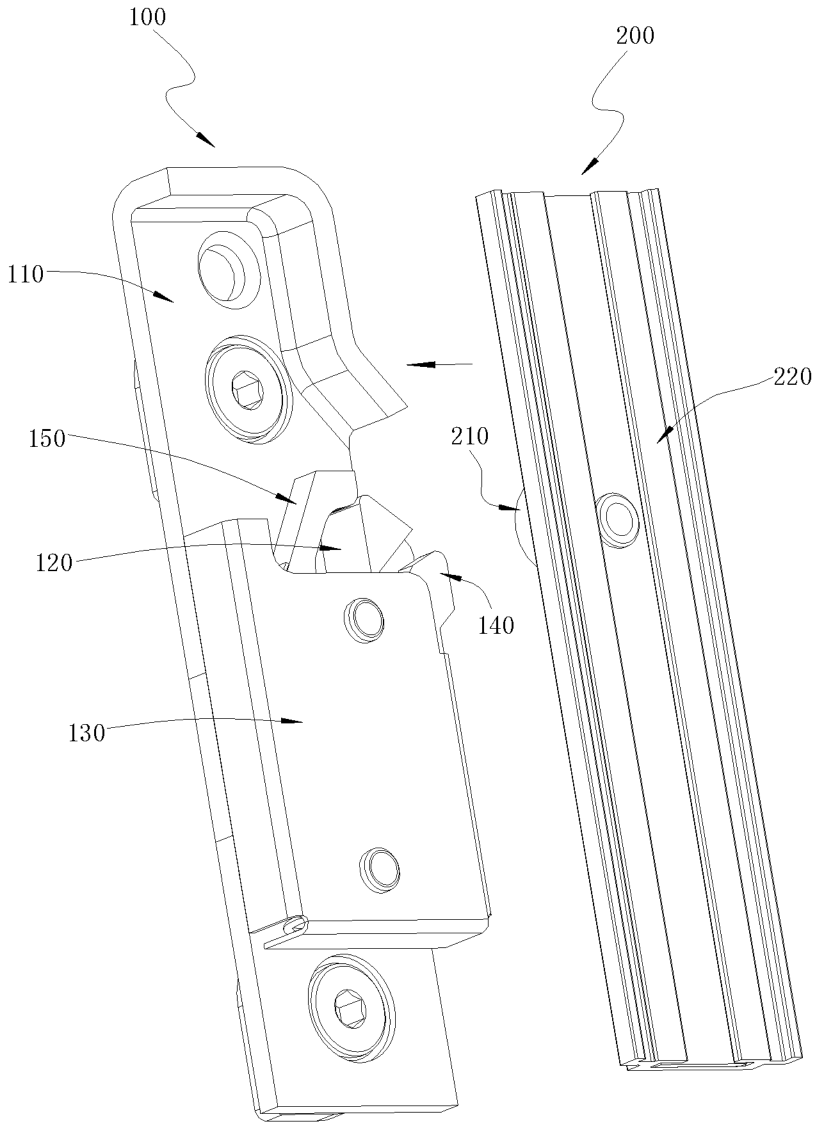
FIG. 1 is a perspective view of an automatic locking device cooperating with an external locking mechanism of an embodiment of the application.

FIG. 1 shows a perspective view of an automatic locking device 100 cooperating with an external locking mechanism 200 according to an embodiment of the present disclosure. The locking mechanism 200 includes a transmission rod 220 and a locking point 210 fixed on the transmission rod 220. The locking point 210 can be automatically locked into the automatic locking device 100 along a locking path in a horizontal movement direction shown by the arrow in FIG. 1. The transmission rod 220 can be driven by an external force to drive the locking point 210 to move up and down in an up-down movement direction perpendicular to the horizontal movement direction. The locking mechanism 200 can be realized by the prior art and will not be described in detail in the present disclosure. The automatic locking device 100 mainly includes a locking base 110, a locking tongue 120, a locking cover 130, a force assisting lever 140, and an unlocking lever 150. The locking tongue 120 is slidably mounted on the locking base 110 in an elastic resettable manner in the up-down movement direction perpendicular to the horizontal movement direction in which the locking point 210 is locked. The locking cover 130 is fixedly connected to the locking base 110 to cover the locking tongue 120.

Figure 2:
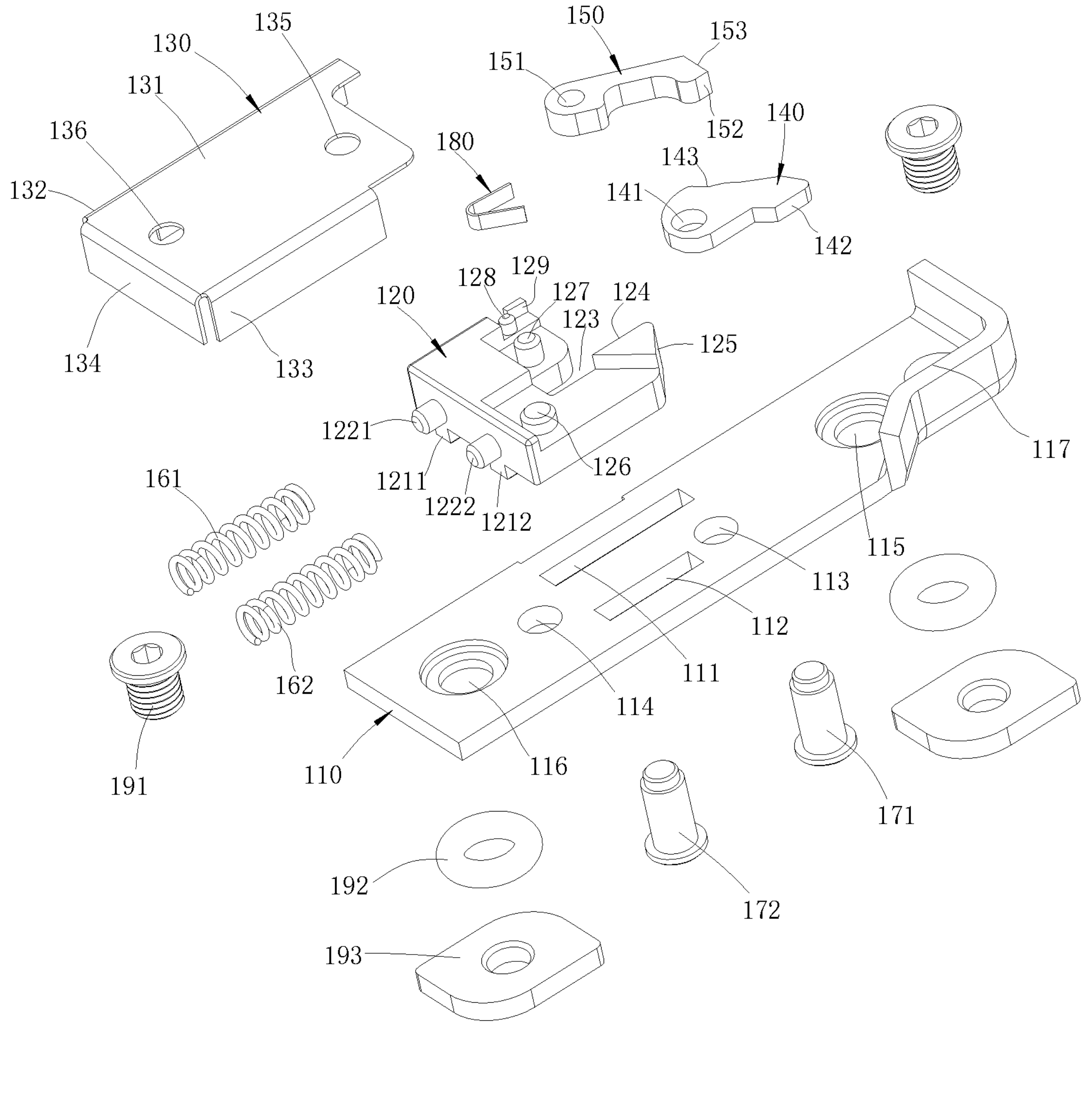
FIG. 2 is an exploded view of the automatic locking device shown in FIG. 1.
Figure 3:
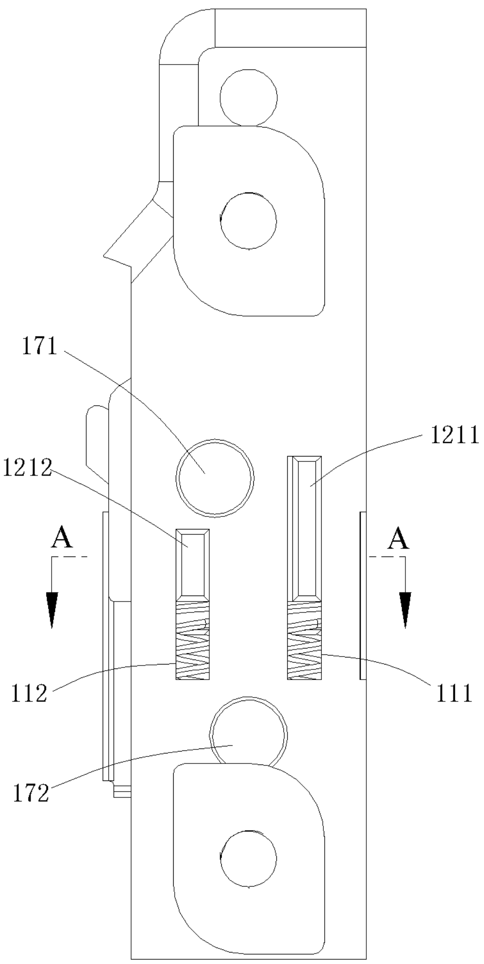
FIG. 3 is a rear view of the automatic locking device shown in FIG. 1.
Figure 4:
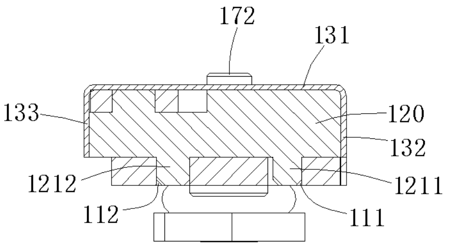
FIG. 4 is a cross-sectional view taken along line A-A of FIG. 3.

Particularly, as shown in FIG. 2, FIG. 3, and FIG. 4, the locking base 110 is provided with a first sliding groove 111 and a second sliding groove 112 extending in an up-down direction. A first sliding block 1211 and a second sliding block 1212 are protruded on a surface of the locking tongue 120 opposite to the locking base 110. The first sliding block 1211 and the second sliding block 1212 cooperate with the first sliding groove 111 and the second sliding groove 112, respectively. The first sliding block 1211 and the second sliding block 1212 are slidably inserted into the corresponding first sliding groove 111 and the second sliding groove

112, so as to guide the locking tongue 120 to slide up and down relative to the locking base 110. The locking cover 130 includes a top plate 131, two side plates 132 and 133 located on both sides of the top plate 131, and a lower end plate 134 located on a lower end of the top plate 131. The locking cover 130 is fixedly connected to the locking base 110 by a first rivet 171 and a second rivet 172 respectively provided at upper and lower ends in a sliding direction of the locking tongue 120, thereby covering the locking tongue 120 in a space surrounded by the top plate 131 and the two side plates 132 and 133. The first sliding block 1211 and the second sliding block 121 of the locking tongue 120 are restricted from being disengaged from the first sliding groove 111 and the second sliding groove 112 of the locking base 110 (see FIG. 4), thereby ensuring that the locking tongue 120 can only slide up and down. Furthermore, the first rivet 171 and the second rivet 172 also act to limit an up and down sliding stroke of the locking tongue 120. When the locking tongue 120 is pushed against to slide down to an end of the sliding stroke, the lower end of the locking tongue 120 will abut against the second rivet 172. When the locking tongue 120 elastically resets upward to the end of the sliding stroke, the upper end of the locking tongue 120 will abut against the first rivet 171, which will be explained later in the description of an operation of the automatic locking device 100.

Figure 5:
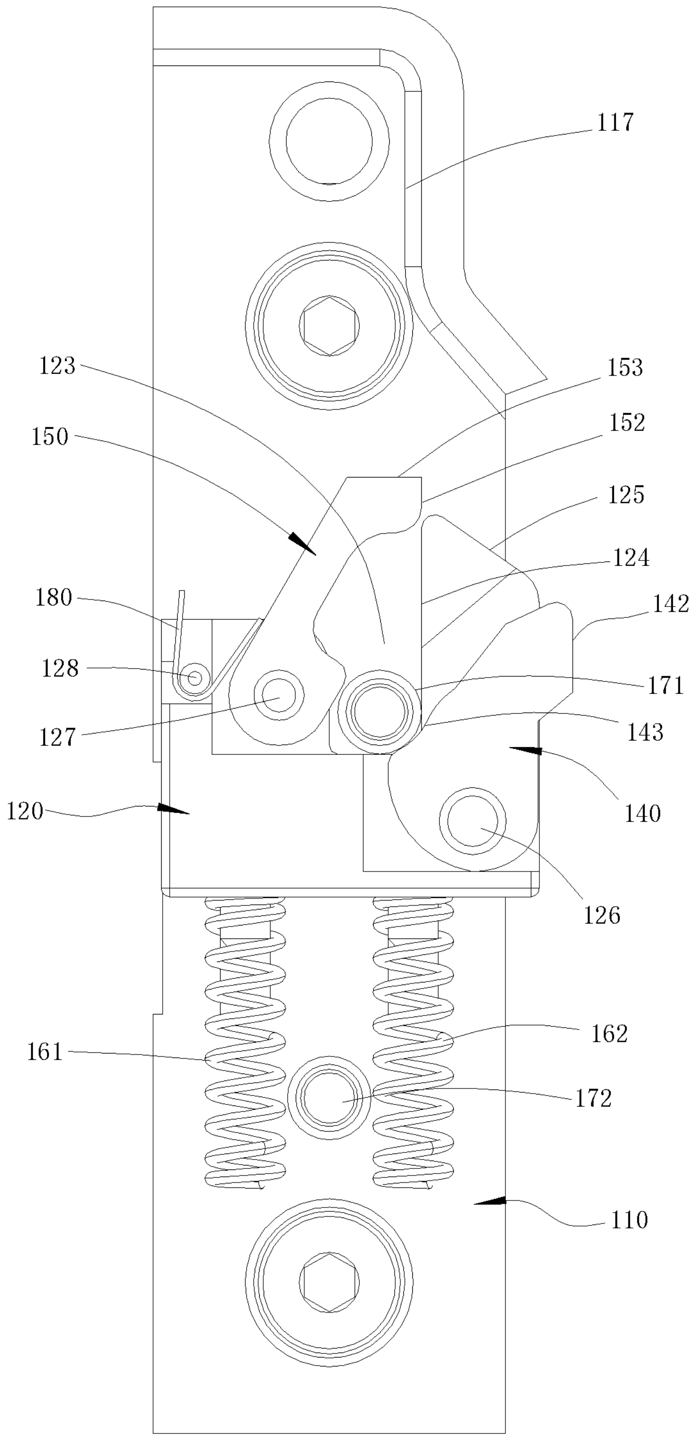
FIG. 5 is a front view of the automatic locking device shown in FIG. 1 after removing a locking cover.

Particularly, as shown in FIG. 2 and FIG. 5, the lower end of the locking tongue 12 in the sliding direction are protruded downward with a first spring mounting column 1221 and a second spring mounting column 1222. Upper ends of a first spring 161 and a second spring 162 are sleeved on the first spring mounting column 1221 and the second spring mounting column 1222, respectively. Lower ends of the first spring 161 and the second spring 162 abut against the lower end plate 134 of the locking cover 130, respectively. When the locking tongue 120 slides downward under an action of external force, the first spring 161 and the second spring 162 will be compressed and deformed. After the external force is released, the first spring 161 and the second spring 162 restores to its initial shape to enable the locking tongue 120 to be elastically reset upward. In optional embodiments, the first spring 161 and the second spring 162 may be replaced by other elastic member that enables the locking tongue 120 to be elastically reset after the locking tongue 120 slides downward, which is not limited to illustrated embodiments.

As shown in FIG. 2 and FIG. 5, the locking tongue 120 is provided with a guiding surface 125 facing an outer side of the locking point 210 on the locking path of the locking point 210. The guiding surface 125 is inclined relative to the sliding direction of the locking tongue 120. The guiding surface 125 is preferably an inclined plane or an inclined arc surface. An inner side of the locking tongue 120 away from the guiding surface 125 forms an engaging surface 124 extending in the sliding direction, and preferably forms an engaging groove 123 configured to lock the locking point 210. Further, the locking tongue 120 is further provided with a first mounting cylinder 126 and a second mounting cylinder 127 protruding from both sides of the engaging groove 123. The force assisting lever 140 is provided with a first mounting hole 141. The force assisting lever 140 is sleeved on the first mounting cylinder 126 through the first mounting hole 141, so as to rotate around the first mounting cylinder 126 relative to the locking tongue 120. The force assisting lever 140 is provided with a first force assisting surface 142 located outside and below the guiding surface 125 of the locking tongue 120, and a second force assisting surface 143 located between the first mounting cylinder 126 and the first rivet 171 and abutting against the first rivet 171. The first force assisting surface 142 is preferably a vertical plane facing the locking point 210. The second force assisting surface 143 is preferably an arc surface cooperating with an outer periphery of the first rivet 171. The unlocking lever 150 is provided with a second mounting hole sleeved on the second mounting cylinder 127, thereby rotating around the second mounting cylinder 127 relative to the locking tongue 120. The unlocking lever 150 is provided with a first acting surface 152 and a second acting surface 153. The first acting surface 152 is located behind the guiding surface 125 of the locking tongue 120 along a horizontal locking direction of the locking point 210. The second acting surface 153 is located on an upper end of the unlocking lever 150. The first acting surface 152 is preferably a vertical plane facing the locking point 210. The second acting surface 153 is preferably a horizontal plane. The locking tongue 120 is further provided with a third mounting cylinder 128 and a V-shaped elastic member 180 is arranged around the third mounting cylinder 128. An end of the V-shaped elastic member 180 abuts against other side of the unlocking lever 150 opposite to the first acting surface 152. The other end of the V-shaped elastic member 180 abuts against a limiting wall 129 protruding from the locking tongue 120. The first acting surface 152 of the unlocking lever 150 is pushed against by the locking point 210, so that the unlocking lever 150 rotates around the second mounting cylinder 127 away from the force assisting lever 140 to avoid the locking tongue 120, the V-shaped elastic member 180 is compressed and deformed. After a pushing force is removed, the V-shaped elastic member 180 recovers to enable the unlocking lever 150 to rotate reversely and reset. In optional embodiments, the V-shaped elastic member 180 may also be replaced by other forms of elastic members, which is not limited to the illustrated embodiments.

Figure 6:
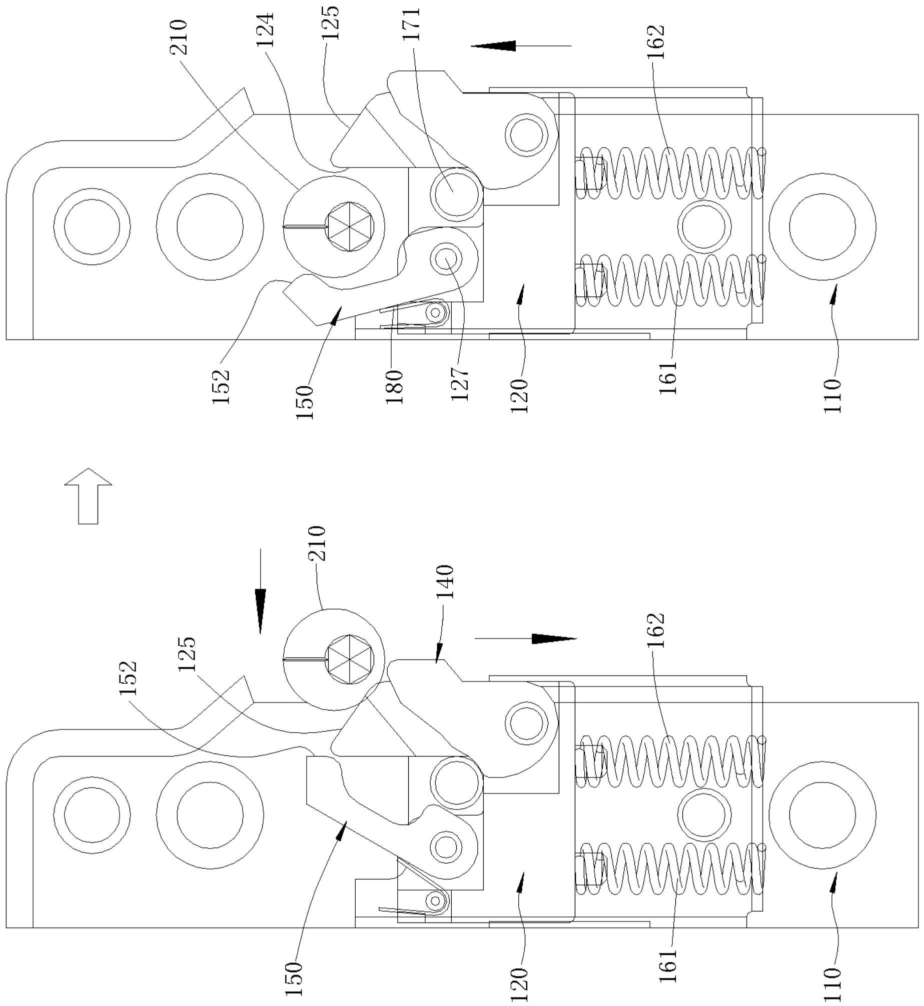
FIG. 6 is a schematic view of the automatic locking device shown in FIG. 1 normally cooperating with a locking point.

As shown in FIG. 6, the automatic locking device 100 according to the above embodiment of the present disclosure normally cooperates with the locking point 210 to realize automatic locking. When a window sash is closed from an open state, the locking point 210 moves along the locking path indicated by an arrow in the horizontal direction in FIG. 6. The locking point 210 firstly abuts against the guiding surface 125 of the locking tongue 120 and then pushes against the guiding surface 125, so that the locking tongue 120 slides downward relative to the locking base 110 in a direction indicated by the vertical downward arrow in FIG. 6. Meanwhile, when the locking point 210 pushes against the guiding surface 125 to abut against the first acting surface 152 of the unlocking lever 150, the locking tongue 120 pushes against the first acting surface 152 to enable the unlocking lever 150 to rotate about the second mounting cylinder 127 away from the force assisting lever 140, so that the unlocking lever 150 can avoid the locking point 210, and compresses and deforms the V-shaped elastic member 180. When the locking point 210 crosses the guiding surface 125, the pushing force against the locking tongue 120 is released, and the locking tongue 120 is elastically reset. Specially, the locking tongue 120 slides upward in a direction indicated by a vertical upward arrow in FIG. 6 until the upper end of the locking tongue 120 abuts against the first rivet 171, the locking tongue 120 resets in place. At this time, the locking point 210 is clamped between the unlocking lever 150 and the engaging surface 124 of the locking tongue 120, and the engaging surface 124 blocks a horizontal outward movement of the locking point 210 and locks the locking point 210.

Figure 7:
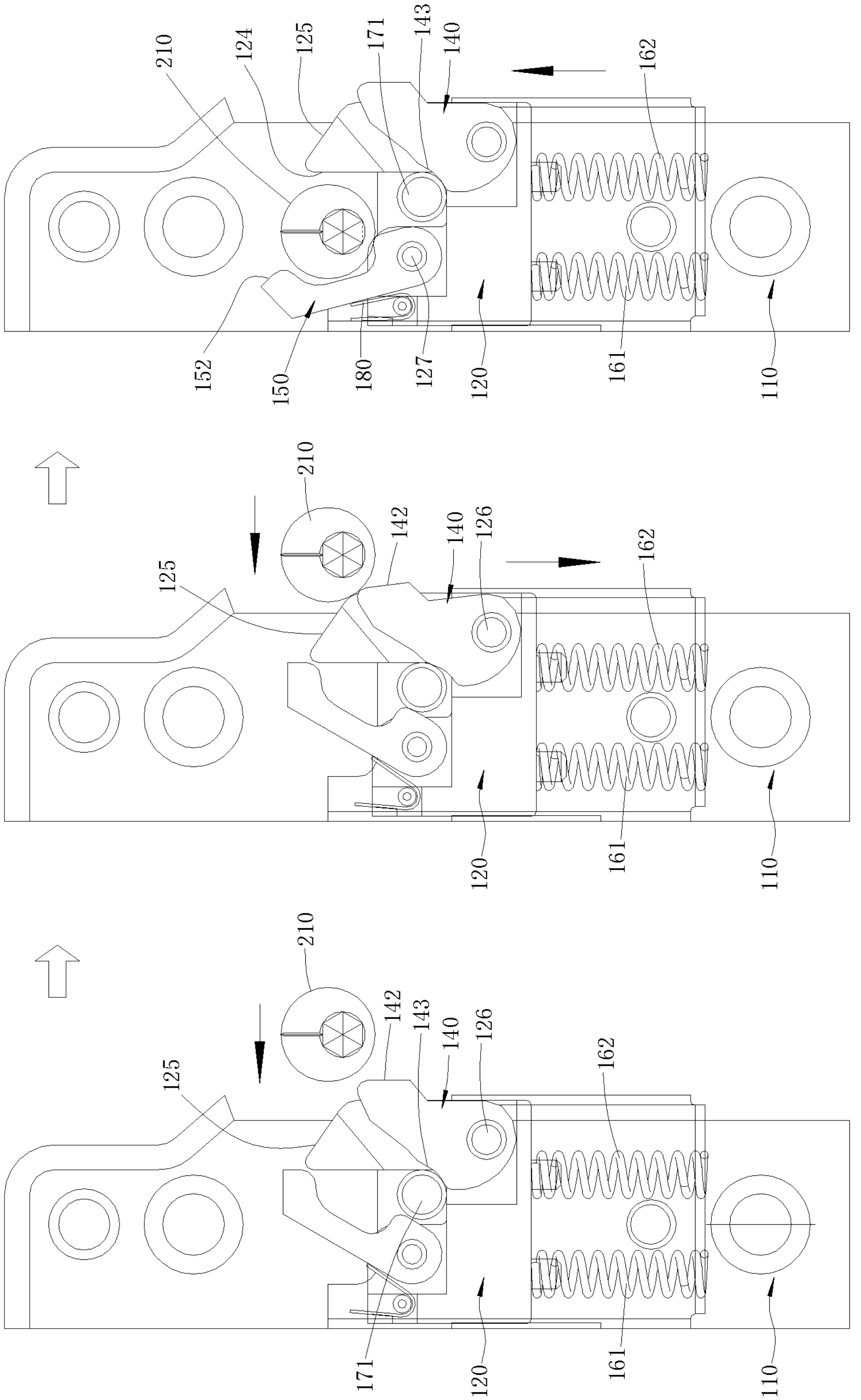
FIG. 7 is a schematic view of the automatic locking device shown in FIG. 1 cooperating with the locking point moving downward.

When the locking point 210 is away from the automatic locking device 100 compare to the normal position shown in FIG. 6 due to a tilting or dropping of the window sash, referring to FIG. 7, the locking point 210 moves along the locking path in a direction indicated by the horizontal arrow in FIG. 7. Firstly, the locking point 210 abuts against the first force assisting surface 142 of the force assisting lever 140. Then the locking point 210 pushes against the first force assisting surface 142 during continued horizontal movement to enable the force assisting lever 140 to rotate around the first mounting cylinder 126. At the same time, the second force assisting surface 143 of the force assisting lever 140 abuts against the outer periphery of the first rivet 171, and takes the first rivet 171 as a fulcrum to enable the locking tongue 120 to slide in a direction indicated by a vertical downward arrow in FIG. 7, so as to drive the guiding surface 125 of the locking tongue 120 to move downward until the locking point 210 abuts against the guiding surface 125. Thereafter, the locking point 210 pushes against the guiding surface 125 and continues to push the locking tongue 120 to slide downward as in the normal automatic locking process shown in FIG. 6, while the first acting surface 152 of the unlocking lever 150 is pushed against by the locking tongue 120 to rotate away from the force assisting lever 140 to avoid the locking point 210. When the locking point 210 crosses the guiding surface 125, the locking tongue 120 is elastically reset and slide upward, and the locking point 210 is locked between the engaging surface 124 and the unlocking lever 150. At the same time, during the elastic resetting of the locking tongue 120, the second force assisting surface 143 of the force assisting lever 140 abuts against the outer periphery of the first rivet 171 again to enable the force assisting lever 140 to rotate reversely and reset.

Figure 8:
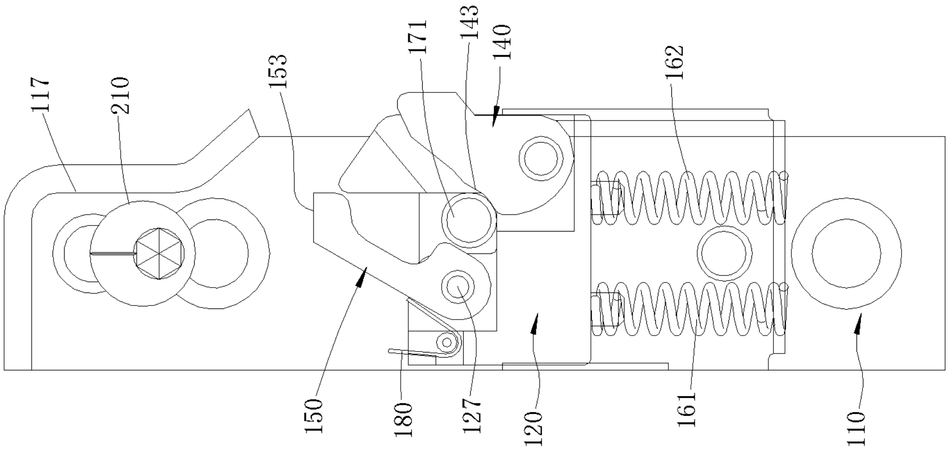
FIG. 8 is a schematic view of the automatic locking device as shown in FIG. 1 normally locking the locking point which is driven upward.

After the locking point 210 is locked into the automatic locking device 100 through the automatic locking process shown in FIG. 6 or FIG. 7, a handle of the transmission rod 220 for driving the locking mechanism 200 is rotated from a flat-open state to a locking state, so that the locking point 210 can be driven to move upward along the engaging surface 124 of the locking tongue 120 to break away from the blocking of the engaging surface 124. As shown in FIG. 8, the locking base 110 is further provided with a blocking wall 117 aligned with the engaging surface 124 of the locking tongue 120 to prevent the horizontal outward movement of the locking point 210. The locking point 210 continues to be locked, and the window sash is in a normal locking state. Meanwhile, the upward movement of the locking point 210 releases a pushing force against the unlocking lever 150. The unlocking lever 150 rotates reversely and resets under the elastic force of the V-shaped elastic member 180 to restore to its initial shape. At this time, the second acting surface 153 of the unlocking lever 150 is located directly below the locking point 210 and above the engaging surface 124 of the locking tongue 120.

Figure 9:
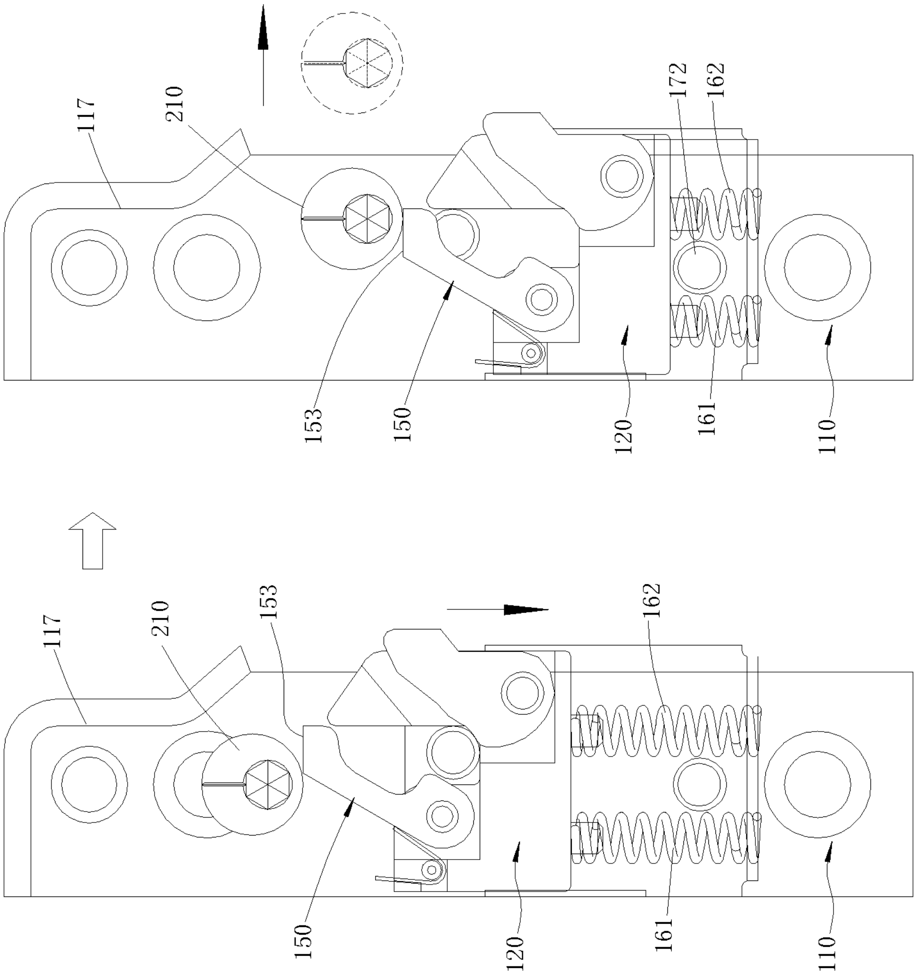
FIG. 9 is a schematic view of the automatic locking device shown in FIG. 1 unlocking the locking point which is driven downward.

Referring to FIG. 9, when the handle of the transmission rod 220 for driving the locking mechanism 200 is rotated from the locking state to the flat-open state, the locking point 210 is driven to move downward along a direction of the vertical downward arrow in FIG. 9. During a downward movement of the locking point 210, the locking point 210 will abut against the second acting surface 153 of the unlocking lever 150, then the unlocking lever 150 drives the locking tongue 120 to slide downward through the second acting surface 153, so that the locking tongue 120 can avoid the locking point 210. When the locking point 210 moves down to free from the blocking of the blocking wall 117, the locking tongue 120 also slides downward to an end of the sliding stroke where the lower end of the locking tongue 120 abuts with the second rivet 172. At this time, the locking point 210 can be disengaged from the automatic locking device 100 in a direction indicated by a horizontal arrow in FIG. 9 to realize unlocking. Thereafter, the locking tongue 120 is elastically reset, and the automatic locking device 100 returns to initial state.

According to the automatic locking device 100 of the above embodiment, the automatic locking of the locking point 210 can be achieved through the cooperation of the guiding surface 125 of the slidable locking tongue 120 and the engaging surface 124. The force assisting lever 140 mounted on the locking tongue 120 is rotated to compensate for a temporary failure of the guiding surface caused by the downward movement of the locking point 210, and the locking point 210 can be unlocked from the automatic locking state to the normal locking state by rotating the unlocking lever 150 mounted on the locking tongue 120. According to the automatic locking device 100 of the above embodiments, the locking point 210 also can be locked automatically and normally even if the locking point 210 is away from the automatic locking device 100 due to a tilting or dropping of the window sash, improving safety performance of a window and user experience. Moreover, a structure of the automatic locking device 100 for preventing failure due to downward movement of the locking point 210 and an unlocking structure are simple and practical, and convenient to be mounted. In addition, according to the automatic locking device 100 of the above embodiments, by providing the blocking wall 117, it is ensured that a user must first drive the locking point 210 downward by a handle before unlocking, so as to avoid opening the window before the locking point 210 returns to the automatic locking position and causing a failure to realize automatic locking the next time.

Figure 10:
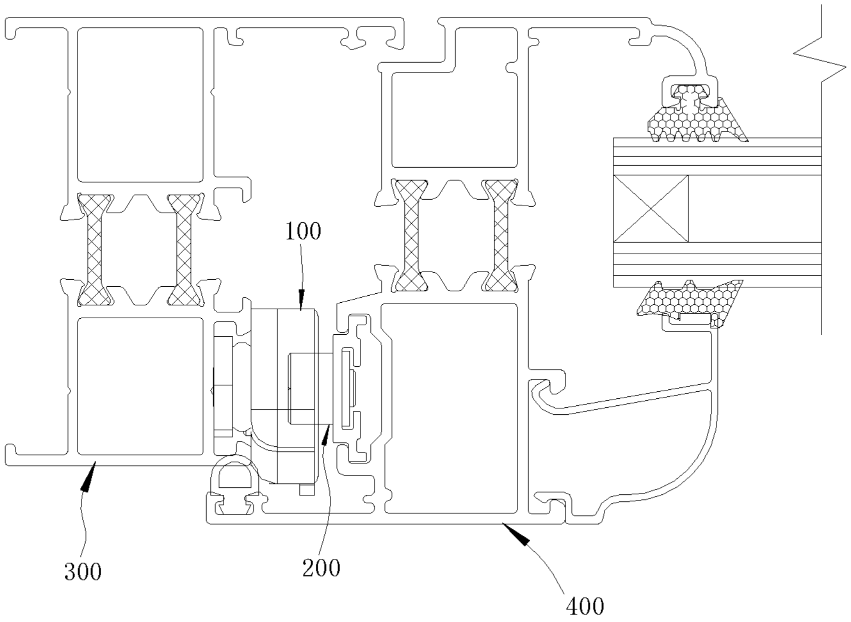
FIG. 10 is a schematic view of a window according to an embodiment of the application with a window sash in a locking state.
Figure 11:
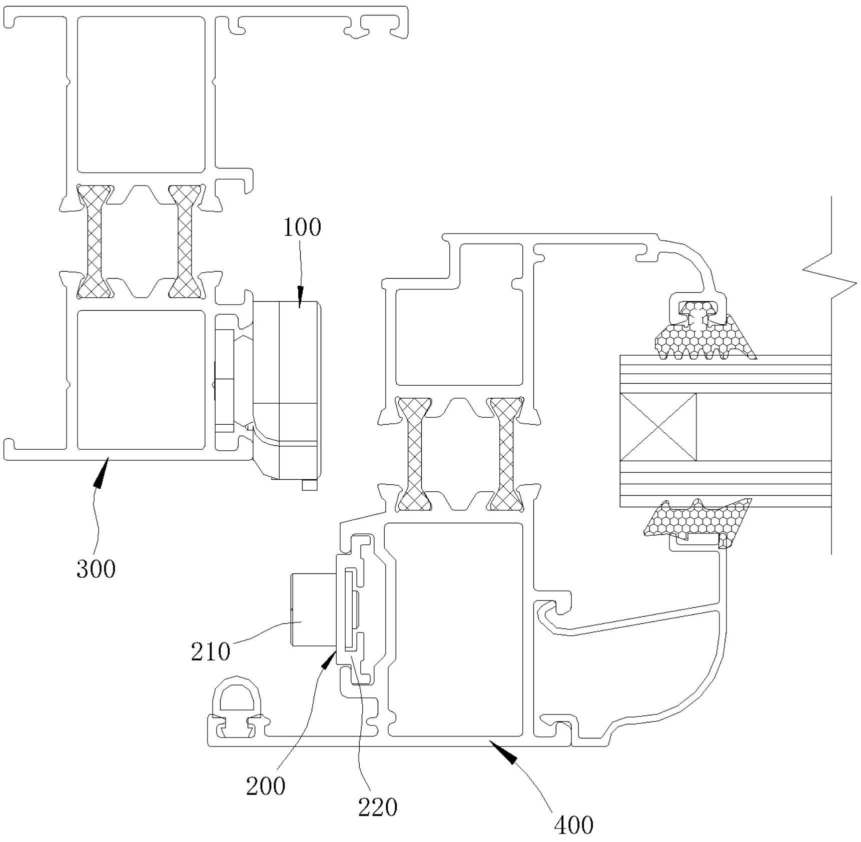
FIG. 11 is a schematic view of the window shown in FIG. 10 with the window sash in an open state.

FIG. 10 and FIG. 11 show a schematic view of a window according to an embodiment of the application with a window sash in a locking state and an open state, respectively. Referring to FIG. 10 and FIG. 11, the window includes a window frame 300 and a window sash 400. The window sash 400 includes the aforementioned locking mechanism 200. The window frame 300 includes the aforementioned automatic locking device 100. As shown in FIG. 2, upper and lower ends of the locking base 110 are respectively provided with mounting holes 115 and 116. The locking base 110 may be fixed to the window frame 300 by a screw 191 passing through the mounting holes 115, 116, a rubber ring 191 and a washer 193 and being threadedly connected to the window frame 300. When the locking point 210 of the locking mechanism 200 is locked into the automatic locking device 100, the window sash 400 is locked and closed (as shown in FIG. 10). When the locking point 210 of the locking mechanism 200 is unlocked and disengaged from the automatic locking device 100, the window sash 400 is unlocked and opened (as shown in FIG. 11). In optional embodiments, the window frame 300 includes the locking mechanism 200 and the window sash 400 includes the automatic locking device 100, and the locking and unlocking of the window sash 400 can also be realized by the cooperation of the locking point 210 and the automatic locking device 100.

The above are only preferred embodiments of the present disclosure, and are not intended to limit the present disclosure. Any modification, equivalent replacement, and improvement, etc. within the spirit and the principle of the present disclosure, are all supposed to be contained in the scope of protection of the present disclosure.

What is claimed is:

1. An automatic locking device configured to lock a locking point, comprising:

a locking base;

a locking tongue slidably mounted on the locking base in an elastically resettable manner, the locking tongue provided with an inclined guiding surface and an engaging surface away from the guiding surface, the locking point pushing against the guiding surface to enable the locking tongue to slide relative to the locking base while moving along a locking path, and the locking tongue being elastically reset when the locking point crosses the guiding surface and locking the locking point through the engaging surface; and a force assisting lever rotatably mounted to the locking tongue, the force assisting lever being provided with a first force assisting surface and a second force assisting surface, wherein the first force assisting surface is located outside and below of the guiding surface to abut against the locking point in a locking process of a downward movement of locking point, when the locking point pushes against the first force assisting surface to enable the force assisting lever to rotate, the second force assisting surface abuts against a fulcrum fixed on the locking base and enable the locking tongue to slide downward until the locking point is in contact with the guiding surface, when the locking point crosses the guiding surface and the locking tongue is elastically reset, the second force assisting surface abuts against again the fulcrum and enable the force assisting lever to rotate reversely and reset;

wherein the locking base is also provided with a blocking wall aligned with the engaging surface of the locking tongue, and the locking point is driven to move up along the engaging surface of the locking tongue and is locked by the blocking wall after the locking point is disengaged from the engaging surface;

wherein the automatic locking device further comprises an unlocking lever rotatably mounted on the locking tongue in an elastically resettable manner, the unlocking lever comprises a first acting surface and a second acting surface, the first acting surface abuts with the locking point when the locking point pushes against the guiding surface to be locked between the engaging surface and the unlocking lever, so that the unlocking lever is pushed by the locking point to rotate to avoid the locking tongue, the second acting surface is located below the locking point when the unlocking lever rotates reversely and resets after the locking point is driven to move up and disengaged from the engaging surface, in a process that the locking point is driven to move down, the second acting surface abuts with the locking point, so as to enable the unlocking lever to drive the locking tongue to slide down until the locking point is disengaged from a blocking of the blocking wall.

2. The automatic locking device according to claim 1, wherein the locking tongue is provided with a first mounting cylinder, the force assisting lever is provided with a first mounting hole, and the force assisting lever is sleeved on the first mounting cylinder through the first mounting hole.

3. The automatic locking device according to claim 1, wherein the locking base is provided with at least a sliding groove extending in an up-down direction, at least one sliding block cooperating with the at least one sliding groove is protruded from a surface of the locking tongue opposite to the locking base, the at least one sliding block is slidably inserted into at least one sliding groove, and a locking cover is fixed to the locking base and configured to cover the locking tongue to restrict the sliding block of the locking tongue from disengaging from the sliding groove.

4. The automatic locking device according to claim 3, wherein at least one spring is abutted between a lower end of the locking tongue in a sliding direction of the locking tongue and a lower end of the locking cover, and the locking tongue is capable of being pushed by the locking point to slide downward to deform the spring.

5. The automatic locking device according to claim 3, wherein the locking cover is fixedly connected to the locking base by a first rivet and a second rivet provided at upper and lower ends respectively in the sliding direction of the locking tongue, when the locking tongue is pushed by the locking point to slide downward to an end of a sliding stroke, the lower end of the locking tongue abuts against the second rivet, and when the locking tongue is elastically reset upward to the end of the sliding stroke, the upper end of the locking tongue abuts against the first rivet.

6. The automatic locking device according to claim 5, wherein the second force assisting surface of the force assisting lever abuts with a periphery of the first rivet in a process that the locking point pushes against the first force assisting surface to enable the force assisting lever to rotate, so that the second force assisting surface takes the first rivet as the fulcrum to enable the locking tongue to slide downward.

7. The automatic locking device according to claim 1, wherein the locking tongue is provided with a second mounting cylinder, the unlocking lever is provided with a second mounting hole and is sleeved on the second mounting cylinder through the second mounting hole, a V-shaped elastic member is abutted between another side of the unlocking lever opposite to the first acting surface and a limiting wall protruding from the locking tongue, the unlocking lever is pushed against by the locking point and rotates to avoid the locking tongue to deform the V-shaped elastic member.

8. A window, comprising a window frame and a window sash, wherein one of the window frame and the window sash comprises a locking point, another one of the window frame and the window sash comprises the automatic locking device according to claim 1.

* * * * *